United States Patent
Hayes (10) Patent No.: US 9,203,834 B2
(45) Date of Patent: Dec. 1, 2015

(54) COMPUTING SYSTEM WITH IDENTIFICATION MECHANISM AND METHOD OF OPERATION THEREOF

(71) Applicant: Samsung Electronics Co., Ltd., Gyeonggi-Do (KR)

(72) Inventor: Robin D. Hayes, Castro Valley, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 281 days.

(21) Appl. No.: 13/886,814

(22) Filed: May 3, 2013

(65) Prior Publication Data

US 2014/0282932 A1   Sep. 18, 2014

Related U.S. Application Data

(60) Provisional application No. 61/782,283, filed on Mar. 14, 2013.

(51) Int. Cl.
*H04L 29/06* (2006.01)

(52) U.S. Cl.
CPC ........ *H04L 63/0853* (2013.01); *H04L 63/0492* (2013.01)

(58) Field of Classification Search
None
See application file for complete search history.

(56) References Cited

U.S. PATENT DOCUMENTS

| | | | |
|---|---|---|---|
| 2008/0287161 A1 | 11/2008 | Sela | |
| 2008/0300020 A1* | 12/2008 | Nishizawa et al. | 455/558 |
| 2010/0267419 A1* | 10/2010 | Nishizawa et al. | 455/558 |
| 2012/0243159 A1 | 9/2012 | Aguirre et al. | |
| 2013/0072255 A1* | 3/2013 | Levionnais et al. | 455/552.1 |

FOREIGN PATENT DOCUMENTS

| | | |
|---|---|---|
| EP | 2202844 | 6/2010 |
| EP | 2228754 | 9/2010 |
| JP | 2003324768 A | 11/2003 |
| KR | 1020080058924 A | 6/2008 |
| KR | 100856831 B1 | 9/2008 |
| KR | 1020110072070 A | 6/2011 |
| WO | 2006137740 | 12/2006 |
| WO | 2012151956 | 11/2012 |

* cited by examiner

*Primary Examiner* — Minh Dinh
(74) *Attorney, Agent, or Firm* — IP Investment Law Group (57) ABSTRACT

A method of operation of a computing system includes: providing a portable authorization module having a module enclosure and an identification unit, the module enclosure completely covering unit contacts of the identification unit; receiving operation power wirelessly for operation of the portable authorization module; and transmitting an identification signal from the portable authorization module for identifying communication from a device.

20 Claims, 5 Drawing Sheets

COMPUTING SYSTEM WITH IDENTIFICATION MECHANISM AND METHOD OF OPERATION THEREOF

CROSS-REFERENCE TO RELATED APPLICATION(S)

This application claims the benefit of U.S. Provisional Patent Application Ser. No. 61/782,283 filed Mar. 14, 2013, and the subject matter thereof is incorporated herein by reference thereto.

TECHNICAL FIELD

An embodiment of the present invention relates generally to a computing system, and more particularly to a system for identification.

BACKGROUND

Modern consumer and industrial electronics, especially devices such as computers, laptop computer, tablet computers, cellular phones, portable digital assistants, and combination devices, are providing increasing levels of functionality to support modern life including communication and data transmission services. Research and development in the existing technologies can take a myriad of different directions.

The increasing demand for information in modern life requires users to access information at any time, while a variety of consumer devices allow for increased functionalities. However, increasing demand for secure information across multiple devices has been limited even though the consumer devices allow for increased functionalities.

Thus, a need still remains for a computing system with identification mechanism for portable authorization. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: a portable authorization module including: a module enclosure; an identification unit configured to provide an identification signal for identifying communication, the module enclosure completely covering unit contacts of the identification unit; and a module antenna, connected to the identification unit, configured to receive operation power wirelessly for operation of the portable authorization module; and a module attachment unit along an external surface of the module enclosure configured to attach the portable authorization module to a device.

An embodiment of the present invention provides a method of operation of a computing system including: providing a portable authorization module having a module enclosure and an identification unit, the module enclosure completely covering unit contacts of the identification unit; receiving operation power wirelessly for operation of the portable authorization module; and transmitting an identification signal from the portable authorization module for identifying communication from a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

A computing system provides users a method for portable identity and network access for one or more devices owned by a single user. The computing system can include a portable module containing identification information that grants access or authorization to a network for a device. The portable module that can be attached to an external surface of the device. The portable module and the device can engage in wireless information and power transfer.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

Figure 1:
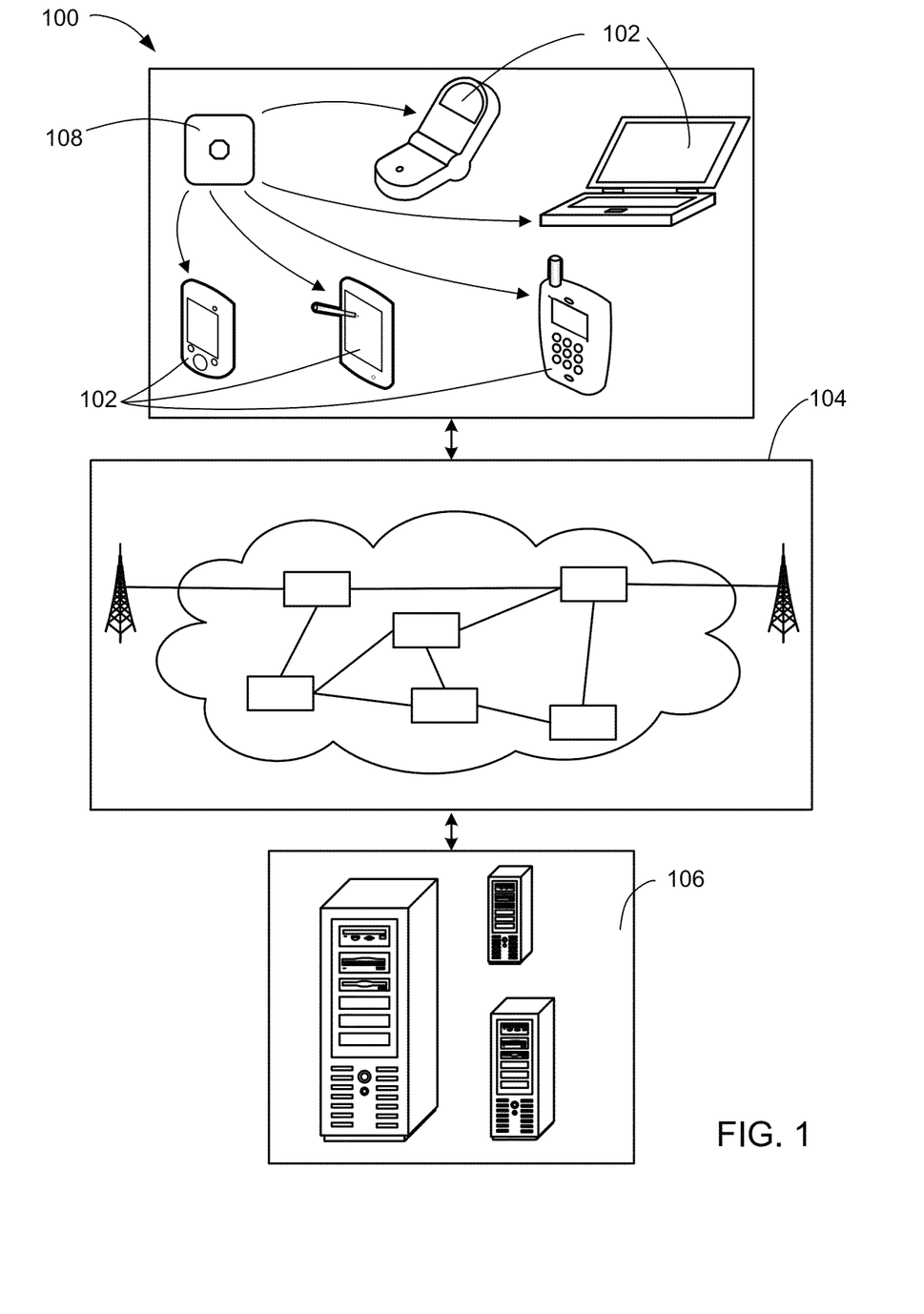
FIG. 1 is a computing system with identification mechanism in an embodiment of the present invention.

Referring now to FIG. 1, therein is shown a computing system 100 with identification mechanism in an embodiment of the present invention. The computing system 100 includes a base device 102, such as a client, connected to a host device 106, such as a server. The base device 102 can communicate with the host device 106 with a communication path 104, such as a wireless or wired network.

For example, the base device 102 can be of any of a variety of computing devices, such as a cellular phone, personal digital assistant, a web enabled phone, smart phone, a tablet computer, a notebook computer, or other communication device. The base device 102 can couple, either directly or indirectly, to the communication path 104 to communicate with the host device 106 or can be a stand-alone device.

The host device 106 can be any of a variety of centralized or decentralized computing devices, or video transmission devices. For example, the host device 106 can be a multimedia computer, a laptop computer, a desktop computer, a video game console, grid-computing resources, a virtualized computer resource, cloud computing resource, routers, switches, peer-to-peer distributed computing devices, a media playback device, or a combination thereof.

The host device 106 can be centralized in a single room, distributed across different rooms, distributed across different geographical locations, embedded within a telecommunications network. The host device 106 can couple with the communication path 104 to communicate with the base device 102.

For illustrative purposes, the computing system 100 is described with the host device 106 as a computing device, although it is understood that the host device 106 can be different types of devices. Also for illustrative purposes, the computing system 100 is shown with the host device 106 and the base device 102 as end points of the communication path 104, although it is understood that the computing system 100 can have a different partition between the base device 102, the host device 106, and the communication path 104. For example, the base device 102, the host device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

A portable authorization module 108 can be attached to the base device 102. The portable authorization module 108 is a removable device without exposed external electrical contacts that wirelessly transmits identification information for communication between a device and a server. For example, the portable authorization module 108 can provide identification information to the base device 102 for authentication of information, communication, data, or any combination thereof transmitted between the base device 102 and the host device 106 through the communication path 104. In another example, the portable authorization module 108 can provide authorization, such as an authentication key, to the base device 102 for accessing the host device 106.

The portable authorization module 108 can interact with the base device 102 wirelessly. For example, the portable authorization module 108 can receive, transfer, or transmit information or data to the base device 102 through near field communication (NFC). For example, the attachment of the portable authorization module 108 to the base device 102 can enable lower power transmission of communication between the portable authorization module 108 to the base device 102. The portable authorization module 108 does not include any direct physical electrical contact with the base device 102.

The portable authorization module 108 can be attached to the base device 102. For example, the portable authorization module 108 can be attached to the base device 102 mechanically with a clip or fastener. In another example, the portable authorization module 108 can be attached to the portable authorization module 108 magnetically with electromagnet or a rare earth magnet.

The portable authorization module 108 and the base device 102 can engage in wireless power transfer. For example, the base device 102 can transmit or transfer power to the portable authorization module 108 through induction.

The wireless power transfer between the base device 102 and the portable authorization module 108 can provide power for operating the portable authorization module 108. For example, the base device 102 can transfer power to operate an integrated circuit (not shown) within the portable authorization module 108.

The base device 102 can include electromagnetic shielding that allows transmission of communication signals and transmission of power to operate the portable authorization module 108. For example, the base device 102 can include an electromagnetic shield (not shown) that can contain transmission of specific frequencies but allows frequencies for transmission of communication signals between the host device 104 or the portable authorization module 108 and wireless transfer of power to the portable authorization module 108.

Figure 2:
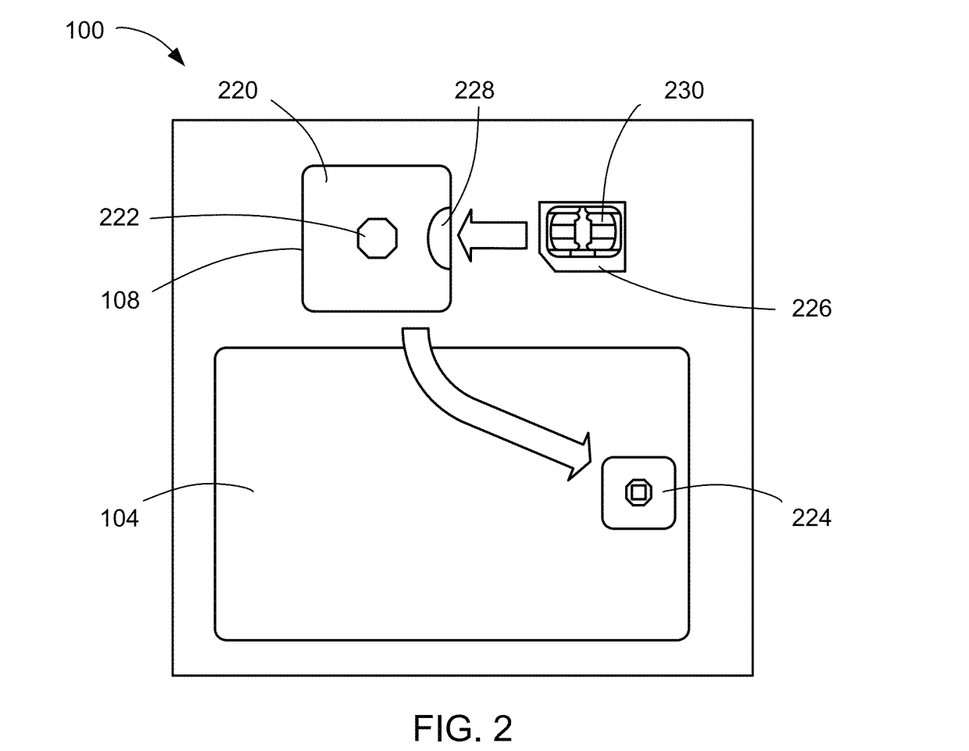
FIG. 2 is a view of the first device and the portable authorization module.

Referring now to FIG. 2, therein is shown a view of the base device 102 and the portable authorization module 108. The portable authorization module 108 can include a module enclosure 220. The module enclosure 220 is a cover that protects the internal components of a portable device or module. For example, the module enclosure 220 can be a metallic or plastic cover. The module enclosure 220 does not provide external electrical contacts to and from the portable authorization module 108. The term external refers to outside of the portable authorization module 108. The module enclosure 220 provides only electrical contacts internal to the module enclosure 220.

The portable authorization module 108 can include an identification component receptacle 228 along a peripheral edge of the module enclosure 220. The identification component receptacle 228 is for accepting devices that stores identification information.

An identification unit 226 can be inserted into the identification component receptacle 228. The identification unit 226 is a device that stores information about the identity of a subscriber or a device for communication on mobile networks. For example, the identification unit 226 can be a subscriber identity module (SIM) card or chip, a radio frequency identification (RFID).

The identification component receptacle 228 can be configured to receive the identification unit 226. The identification component receptacle 228 can be configured such that unit contacts 230 exposed along the surface of the identification unit 226 are completely covered by the module enclosure 220 of the portable authorization module 108. For example, the unit contacts 230 of the identification unit 226 not exposed from the module enclosure 220. The module enclosure 220 covers the unit contacts 230 of the identification unit 226 and protects the identification unit 226 from environmental damage. The module enclosure 220 enables transfer of the portable authorization module 108 between one instance of the base device 102 and a second instance of the base device 102.

The identification component receptacle 228 can be optional. For example, the portable authorization module 108 can include the identification unit 226 that is fully enclosed or hermetically sealed within the module enclosure 220. Fully enclosing or hermetically sealing the portable authorization module 108 protects the identification unit 226 from environmental damage and can enable waterproofing of the portable authorization module 108, the identification unit 226, or a combination thereof.

A module attachment unit 222 can be connected to the portable authorization module 108. The module attachment unit 222 can be a fixture or device that can be used to attach the portable authorization module 108 to the base device 102. For example, the module attachment unit 222 can be a mechanical device, such as a clip or fastener. In another example the module attachment unit 222 can be a magnet, such as an electromagnet or a rare earth magnet. The module attachment unit 222 can firmly attach and accurately position the portable authorization module 108 to the base device 102.

The module attachment unit 222 can be connected to an external surface of the module enclosure 220. The module attachment unit 222 can be centered in the middle of one of the external surfaces of the module enclosure 220.

For illustrative purposes, the module attachment unit 222 is shown having an octagonal shape, although it is understood the module attachment unit 222 can have a different geometric configuration. For example, the module attachment unit 222 can have a square geometric configuration. As a further example, the module attachment unit 222 can include an orientation notch (not shown) to provide a particular orientation of the portable authorization module 108 when attached to the base device 102.

The module attachment unit 222 of the portable authorization module 108 can attach to a device attachment region 224 of the base device 102. The device attachment region 224 can be configured to match the dimensions and functionality of the module attachment unit 222. For example, the device attachment region 224 can include an exposed metallic surface or region for magnetic attachment of the module attachment unit 222. The device attachment region 224 does not include direct physical electrical contact between the portable authorization module 108 and the base device 102.

The device attachment region 224 can be along an exterior portion of the base device 102. The device attachment region 224 can be located in close physical proximity or directly adjacent to a device antenna (not shown), for transmitting power and signals to the portable authorization module 108. The device antenna of the base device 102, for example, can be used for transmitting or transferring power through induction. The base device 102 can include additional instances of the device antenna for separate transmission of signals and transmission or transfer of power to the portable authorization module 108.

As an example, attachment of the portable authorization module 108 positioned directly adjacent to the device antenna of the base device 102 can reduce the power used for transmission, such as through near field communication, between the base device 102 and portable authorization module 108. As another example, the close proximity between the portable authorization module 108 and the base device 102 can reduce interference from other signals and noise.

The portable authorization module 108 can be sized to enable transportation and storage. For example, the portable authorization module 108 including the module attachment unit 222 as a magnet can be attached to a key chain, jewelry, or other ferromagnetic surface.

It has been discovered that covering the unit contacts 230 of the identification unit 226 with the module enclosure 220 provides the benefit of protecting the identification unit 226 from environmental damage and facilitates transfer of the portable authorization module 108 between one instance of the base device 102 and a second instance of the base device 102. It has also been discovered that fully enclosing or hermetically sealing the portable authorization module 108 with the module enclosure 220 provides the benefit of protecting the identification unit 226 from environmental damage and can enable waterproofing of the portable authorization module 108, the identification unit 226, or any combination thereof.

It has further been discovered that attachment of the portable authorization module 108 directly adjacent to the device antenna of the base device 102 provides the benefit of enabling low power near field communication between the base device 102 and portable authorization module 108. It has yet further been discovered that attachment of the portable authorization module 108 in the close proximity with the device antenna of the base device 102 provides the benefit of reduced interference from other signals and noise.

Figure 3:
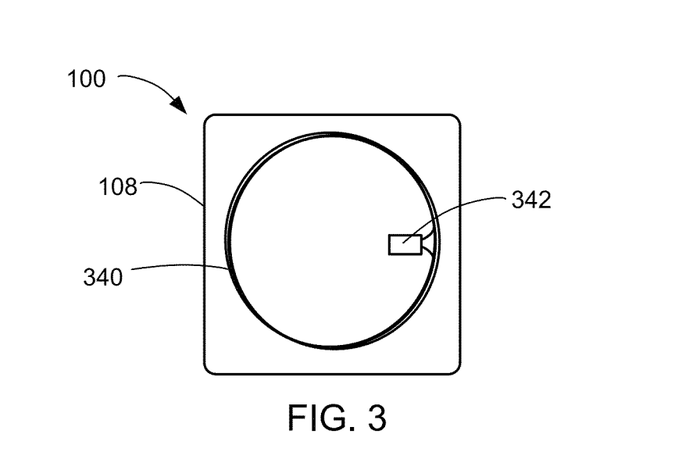
FIG. 3 is a plan view of the portable authorization module.

Referring now to FIG. 3, therein is shown a plan view of the portable authorization module 108. The plan view depicts the portable authorization module 108 without a portion of the module enclosure 220 and the module attachment unit 222, both of FIG. 2.

The portable authorization module 108 can include a module antenna 340. The module antenna 340 can enable wireless communication between the portable authorization module 108, including the identification unit 226, and the base device 102. For example, the module antenna 340 can be used to receive and transmit signals between the portable authorization module 108 and the base device 102 of FIG. 1.

The module antenna 340 can be connected to an antenna interface 342. The antenna interface is for connecting an antenna to other components within a device. For example, the antenna interface 342 can provide connection between the module antenna 340 and other components, such as electrical contacts, within the portable authorization module 108.

Figure 4:
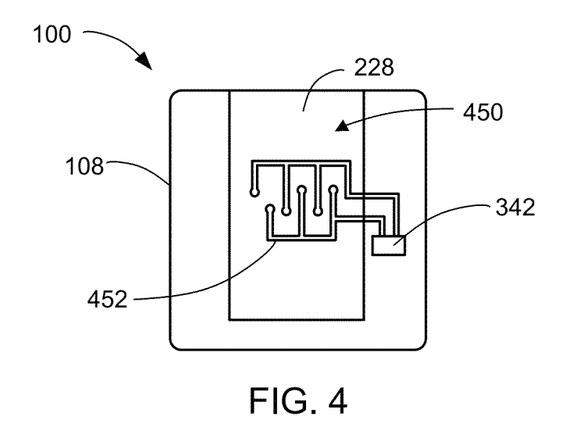
FIG. 4 is a further plan view of the portable authorization module.

Referring now to FIG. 4, therein is shown a further plan view of the portable authorization module 108. The plan view depicts the portable authorization module 108 without the module enclosure 220 of FIG. 2, the module attachment unit 222 of FIG. 2, and the module antenna 340 of FIG. 3 to show a view of an interior portion 450 of the identification component receptacle 228.

The interior portion 450 of the identification component receptacle 228 can include module contacts 452. The module contacts 452 can be used to provide electrical connections to the identification unit 226 of FIG. 2. For example, the module contacts 452 can be connected to the unit contacts 230, of FIG. 2, of the identification unit 226. The antenna interface 342 can connect the module contacts 452 with the module antenna 340. The module antenna 340 can be electrically connected to the identification unit 226 through the antenna interface 342.

Figure 5:
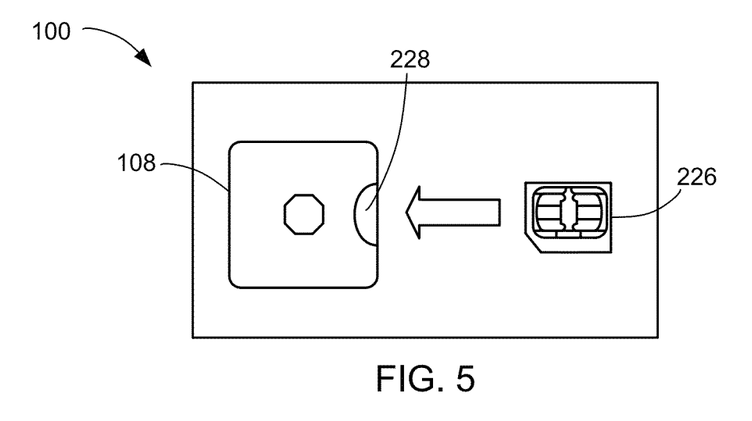
FIG. 5 is a view the portable authorization module in an insertion phase.

Referring now to FIG. 5, therein is shown a view the portable authorization module 108 in an insertion phase. FIG. 5 depicts insertion of the identification unit 226. The identification unit 226 can be inserted into the identification component receptacle 228. The identification unit 226 can be inserted such that the unit contacts 230 are completely covered by the module enclosure 220.

The identification component receptacle 228 can be optional. For example, the identification unit 226 can be sealed within the portable authorization module 108.

Figure 6:
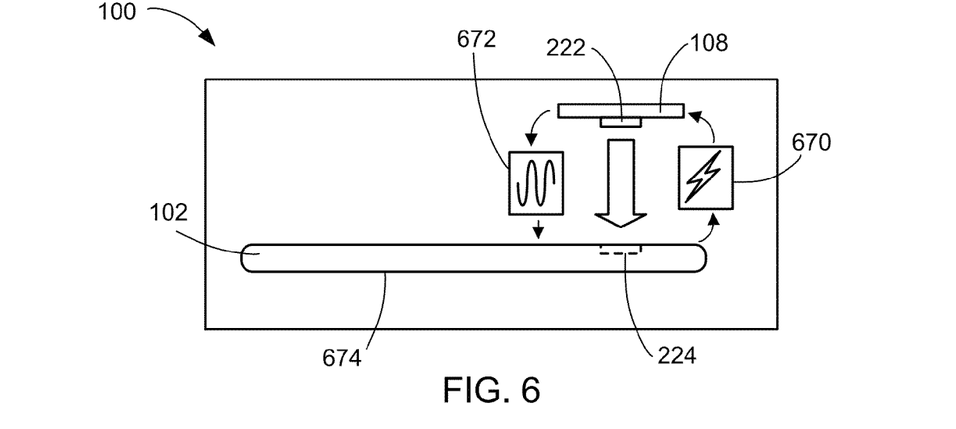
FIG. 6 is a view of the portable authorization module in an attachment phase.

Referring now to FIG. 6, therein is shown a view of the portable authorization module 108 in an attachment phase. The portable authorization module 108 can be attached to an external surface 674, such as a case or cover, of the base device 102. The module attachment unit 222 of the portable authorization module 108 can be connected to the device attachment region 224, as depicted by the dashed lines, of the base device 102.

The base device 102 can transfer operation power 670 to the portable authorization module 108. The operation power 670 is the amount of power to operate the components, such as an integrated circuit having active circuitry, within a device. For example, the operation power 670 can be the power to operate the identification unit 226.

The module antenna 340, of FIG. 3, of the portable authorization module 108 can be used to receive the operation power 670 between and the base device 102. For example, the module antenna 340 can be used to receive the operation power 670 inductively from the base device 102.

As a specific example, the base device 102 can transmit a signal to the portable authorization module 108 when attached to the base device 102. As a specific example, the signal transmitted by the base device 102 can include a power portion and a data portion. To continue the example, the base device 102 can first transmit the power portion of the signal, to activate and power the portable authorization module 108, then switch to the data portion of the signal for communication or transfer or data and information.

The portable authorization module 108 can transmit an identification signal 672 to the base device 102. The identification signal 672 is a signal that identifies communication from a device. For example, the portable authorization module 108 can provide identification signal 672 as identification information to the base device 102 for authentication of information, communication, data, or any combination thereof transmitted between the base device 102 and the host device 106 of FIG. 1 through the communication path 104 of FIG. 1.

The base device 102 can include electromagnetic shielding that allows transmission of the operation power 670. For example, the base device 102 can include an electromagnetic shield than can contain transmission of specific frequencies and signals but allows frequencies for wireless transfer of the operation power 670 to the portable authorization module 108.

The attachment of the portable authorization module 108 can be used to override a second instance of the identification unit 226 of FIG. 2 that is embedded or connected within the base device 102. For example, when the portable authorization module 108 is attached to the base device 102, the identification information, the authorization information, encryption information, or other information for communication associated with the identification unit 226 of the portable authorization module 108 can override the same information associated with the second instance of the identification unit 226 within the base device 102.

The override by the identification unit 226 of the portable authorization module 108 can enable communication, data, information transfer, or any combination thereof through base device 102 to be associated with the portable authorization module 108 rather than the second instance of the identification unit 226 within the base device 102. For example, the transmission of the identification signal 672 of FIG. 6 from the portable authorization module 108 to the base device 102 can override the further instance of the identification unit 226 within the base device 102.

Figure 7:
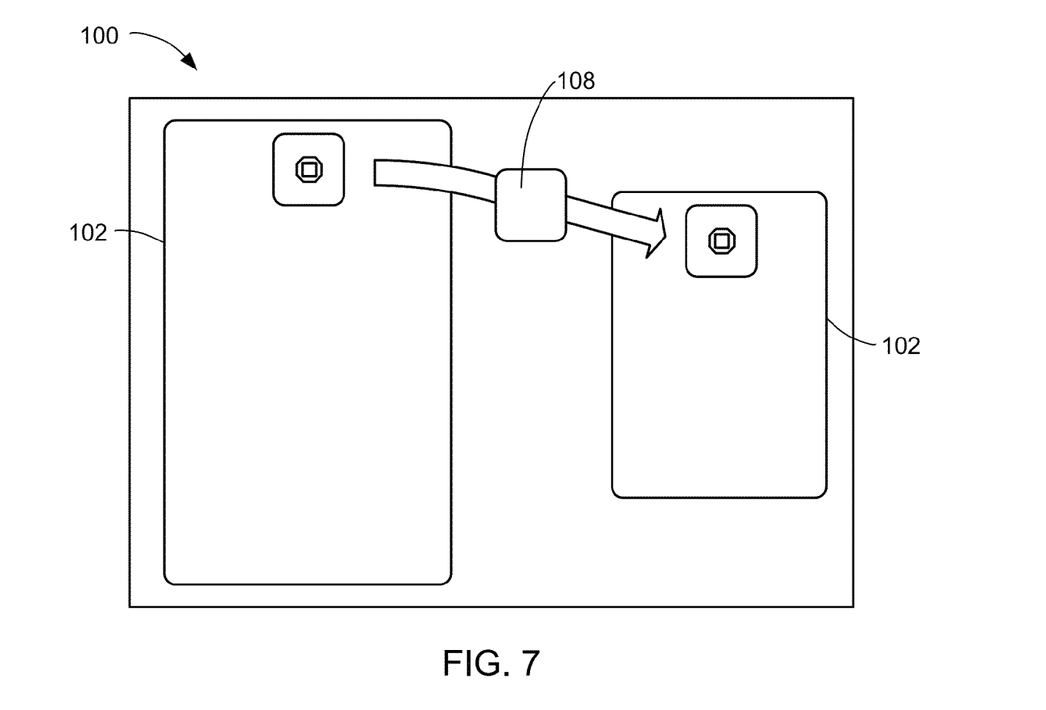
FIG. 7 is a view of the portable authorization module in a transfer phase.

Referring now to FIG. 7, therein is shown a view of the portable authorization module 108 in a transfer phase. The view of the portable authorization module 108 depicts the transfer of the portable authorization module 108 between a first instance of the base device 102 and a second instance of the base device 102. Transferring the portable authorization module 108 to the second instance of the base device 102 can enable identification of information, communication, data, or any combination thereof transmitted between the second instance of base device 102 and the host device 106 of FIG. 1.

Security features can be implemented with the portable authorization module 108 when transferring the portable authorization module 108 from one instance of the base device 102 to the second instance of the base device 102. For example, the portable authorization module 108 can be configured to receive a personal identification code, such as a personal identification number (PIN), prior to operation of the portable authorization module 108. As a specific example, entry of a personal identification number (PIN) can be required prior to operation of the portable authorization module 108, such as use of the portable authorization module 108 with the second instance of the base device 102.

Figure 8:
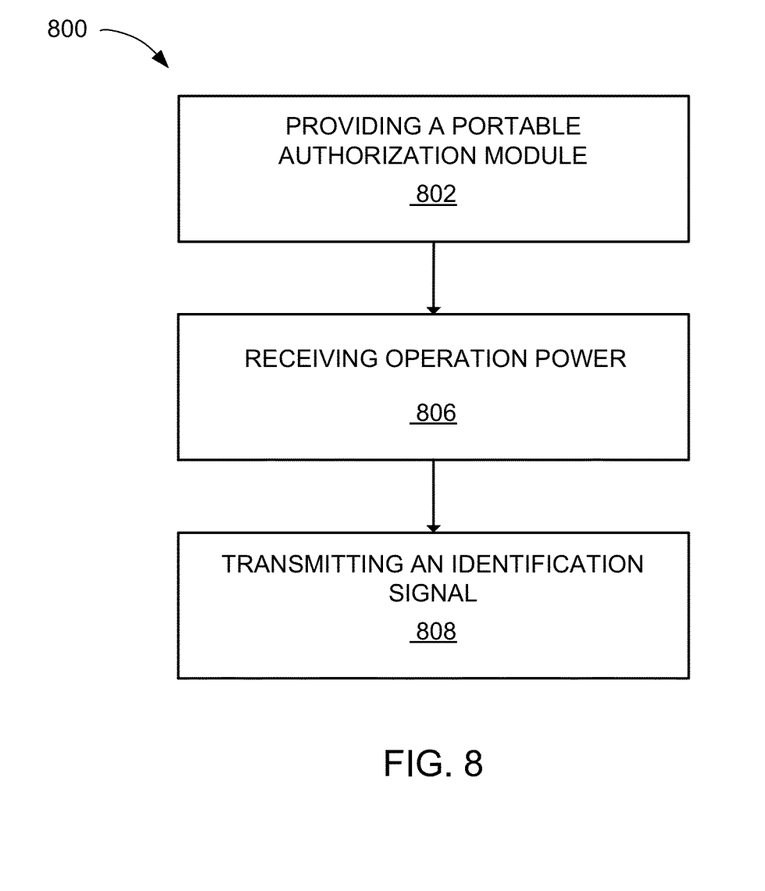
FIG. 8 is a flow chart of a method of operation of a computing system in an embodiment of the present invention.

Referring now to FIG. 8, therein is shown a flow chart of a method 800 of operation of a computing system 100 in an embodiment of the present invention. The method 800 includes: providing a portable authorization module having a module enclosure and an identification unit, the module enclosure completely covering unit contacts of the identification unit in a block 802; receiving operation power wirelessly for operation of the portable authorization module in a block 804; and transmitting an identification signal from the portable authorization module for identifying communication from a device in a block 806.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   a portable authorization module including:
   an identification unit configured to provide an identification signal for identifying communication and overriding the identification signal of a further instance of the identification unit within a device;

a module enclosure covering the covering unit contacts of the identification unit;

a module antenna, coupled to the identification unit, configured to receive operation power wirelessly for operation of the portable authorization module; and a module attachment unit along an external surface of the module enclosure configured to attach the portable authorization module to the device.

2. The computing system of claim 1 wherein the identification unit is hermetically sealed within the module enclosure.

3. The computing system of claim 1 wherein the module antenna is configured to receive the operation power through induction.

4. The computing system of claim 1 wherein the portable authorization module is configured to receive a personal identification code prior to operation of the portable authorization module.

5. The computing system of claim 1 wherein the portable authorization module includes a subscriber identity module.

6. The computing system of claim 1 wherein the identification unit is configured to provide the identification signal for overriding the further instance of the identification unit within the device including enabling communication through the device to be associated with the portable authorization module.

7. The computing system of claim 1 wherein the module enclosure includes an identification component receptacle configured to receive the identification unit.

8. The computing system of claim 1 wherein the module attachment unit includes a magnet.

9. The computing system of claim 1 wherein the module antenna is configured to transmit the identification signal.

10. The computing system of claim 1 wherein the portable authorization module is configured to transmit the identification signal using near field communication.

11. A method of operation of a computing system comprising:

providing an identification signal using a portable authorization module having a module enclosure and an identification unit, the module enclosure covering unit contacts of the identification unit, wherein the identification signal is for overriding the identification signal of a further instance of the identification unit within a device;

receiving operation power wirelessly for operation of the portable authorization module; and transmitting the identification signal from the portable authorization module for identifying communication from the device.

12. The method as claimed in claim 11 wherein the identification unit is hermetically sealed within the module enclosure.

13. The method as claimed in claim 11 wherein receiving the operation power includes receiving the operation power using induction.

14. The method as claimed in claim 11 further comprising requiring entry of a personal identification number prior to operation of the portable authorization module.

15. The method as claimed in claim 11 wherein the identification unit includes a subscriber identity module.

16. The method as claimed in claim 11 wherein providing the identification signal for overriding a further instance of the identification unit within the base device includes enabling communication through the device to be associated with the portable authorization module.

17. The method as claimed in claim 11 wherein the module enclosure includes an identification component receptacle configured to receive the identification unit.

18. The method as claimed in claim 11 further comprising providing a module attachment unit along an external surface of the module enclosure for attaching the portable authorization module to the device.

19. The method as claimed in claim 11 wherein transmitting the identification signal includes transmitting the identification signal with a module antenna of the portable authorization module.

20. The method as claimed in claim 11 wherein transmitting the identification signal includes transmitting the identification signal with near field communication.

* * * * *